United States Patent
DeKoning et al.

(10) Patent No.: US 6,356,969 B1
(45) Date of Patent: Mar. 12, 2002

(54) METHODS AND APPARATUS FOR USING INTERRUPT SCORE BOARDING WITH INTELLIGENT PERIPHERAL DEVICE

(75) Inventors: Rodney A DeKoning, Augusta; Dennis E. Gates; Keith W. Holt, both of Wichita; John R. Kloeppner, Buhler, all of KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/373,864

(22) Filed: Aug. 13, 1999

(51) Int. Cl.[7] ............................................... G06F 13/24
(52) U.S. Cl. ..................... 710/261; 710/262; 710/263; 710/264; 710/266; 710/48; 710/6; 711/114
(58) Field of Search ................................ 710/260–269, 710/46–50, 5–7; 711/114

(56) References Cited

U.S. PATENT DOCUMENTS

| | | | | |
|---|---|---|---|---|
| 5,179,704 A | * | 1/1993 | Jibbe et al. .................. | 710/262 |
| 5,671,365 A | * | 9/1997 | Binford et al. .............. | 710/100 |
| 5,708,814 A | * | 1/1998 | Short et al. .................. | 710/260 |
| 5,805,883 A | * | 9/1998 | Saitoh ......................... | 709/105 |
| 5,875,343 A | * | 2/1999 | Binford et al. .............. | 710/263 |
| 6,065,089 A | * | 5/2000 | Hickerson et al. .......... | 710/266 |
| 6,115,776 A | * | 9/2000 | Reid et al. ................... | 710/260 |
| 6,189,067 B1 | * | 2/2001 | Lowe et al. ................. | 710/260 |
| 6,192,440 B1 | * | 2/2001 | Lowe et al. ................. | 710/260 |
| 6,195,725 B1 | * | 2/2001 | Luhmann ..................... | 710/266 |
| 6,219,727 B1 | * | 4/2001 | Kailash et al. ................ | 710/48 |
| 6,266,732 B1 | * | 7/2001 | Chen et al. .................. | 710/263 |

* cited by examiner

*Primary Examiner*—Christopher B. Shin

(57) ABSTRACT

In one embodiment, the present invention provides a storage system controller (10) having a main processor (12), a memory (14) and a device interface (18) adapted to interface with a peripheral component (28–32). The controller further includes an interrupt management scoreboard (24) adapted to receive a plurality of writes from the peripheral component(s) prior to interrupting the main processor. The main processor identifies a group of tasks to be executed, and sets up the scoreboard to await the completion of the tasks before interrupting the main processor.

20 Claims, 3 Drawing Sheets

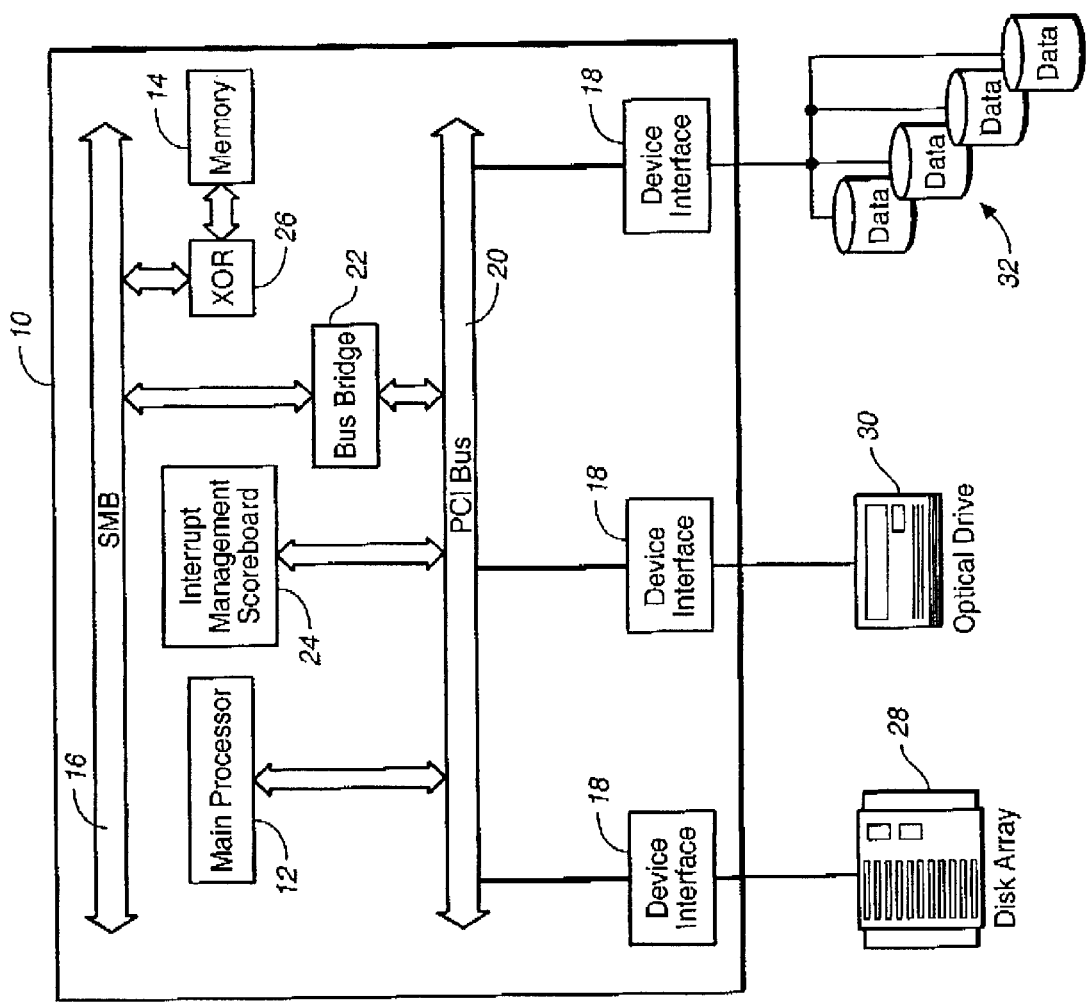
FIG._1

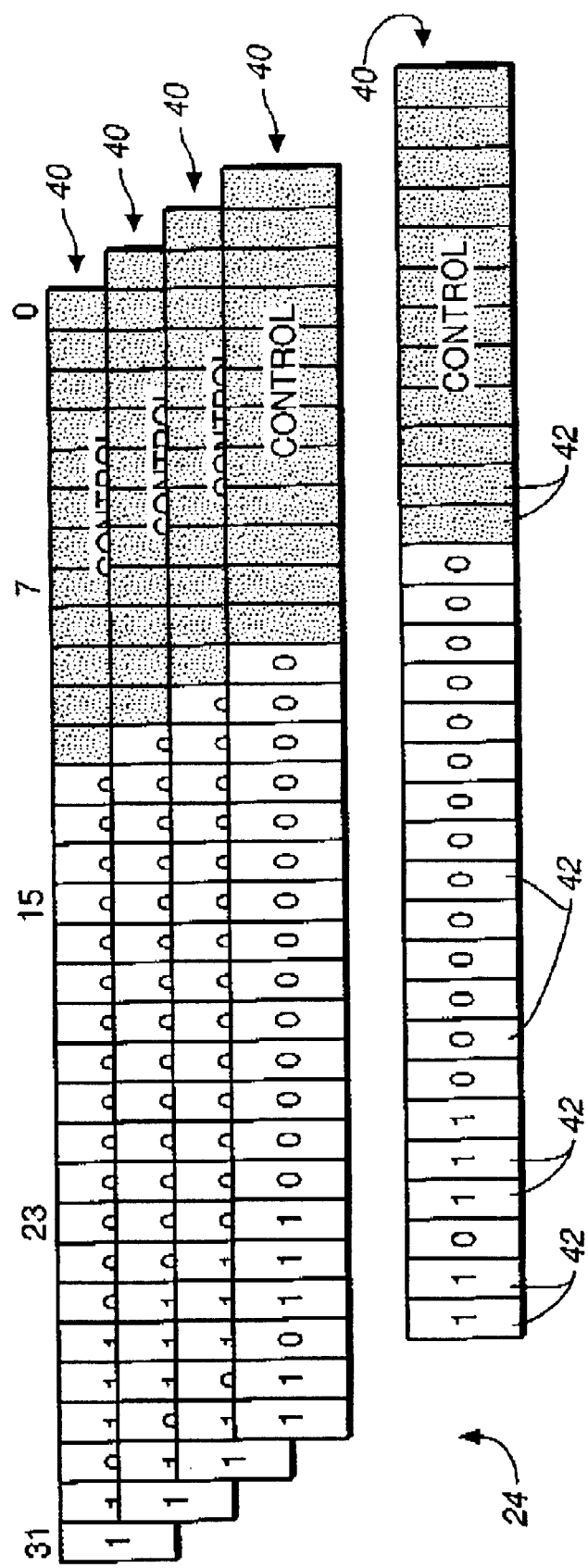
FIG._2

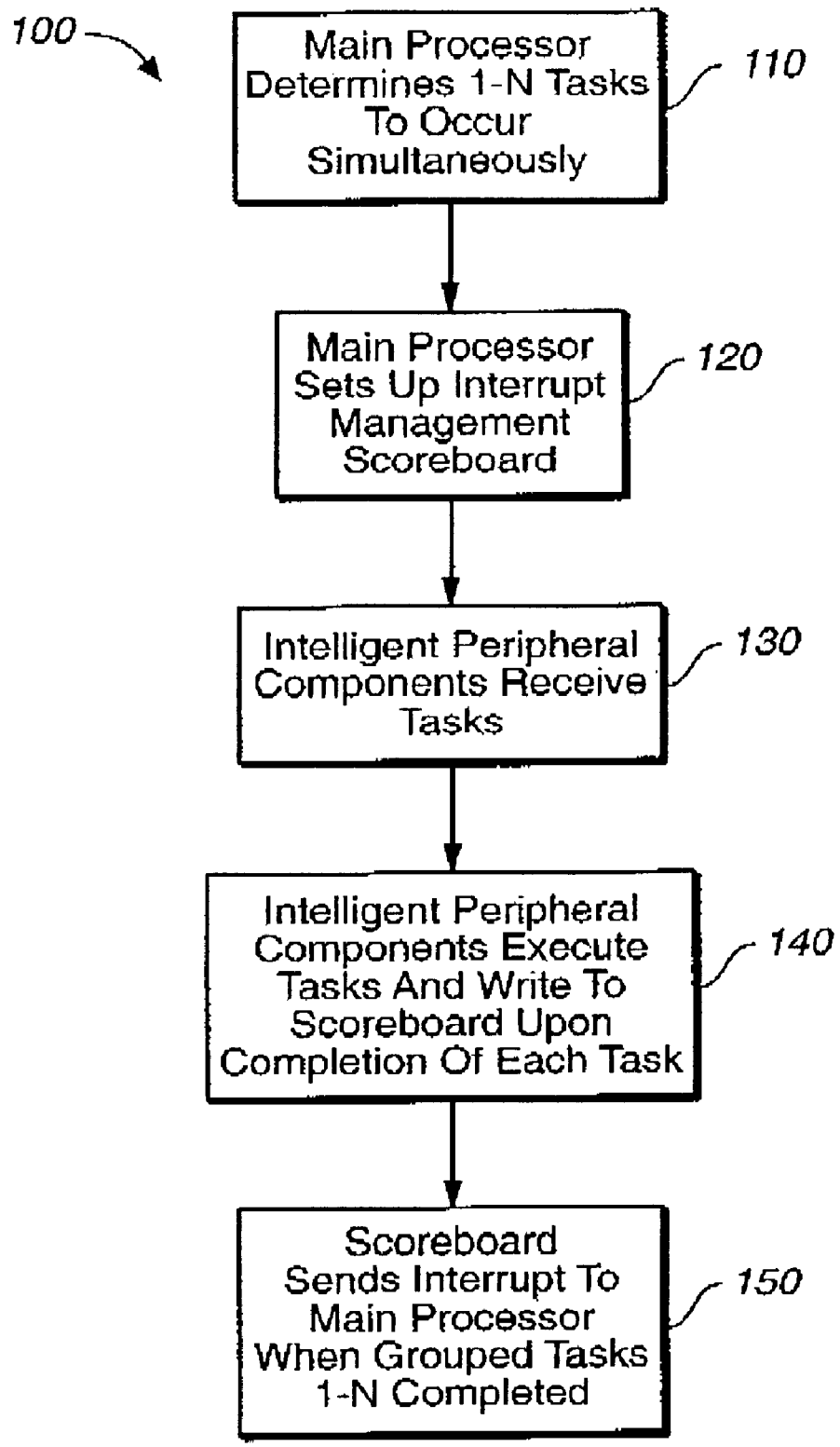
FIG._3

METHODS AND APPARATUS FOR USING INTERRUPT SCORE BOARDING WITH INTELLIGENT PERIPHERAL DEVICE

BACKGROUND OF THE INVENTION

The present invention relates generally to intelligent peripheral devices, and more particularly to intelligent peripheral devices using interrupt score boarding to reduce interrupts to the primary processor.

The management of a number of peripheral devices presents difficulties in providing improved processor performance with a manageable amount of overhead. This is particularly the case for the management of the multiple input/output (I/O) tasks which is inherent in processing RAID operations for future generation RAID storage subsystems. This is due in part to the significant microprocessor overhead required to manage the large number of I/O tasks. In particular, a typical RAID read/modify/write command can require as many as six (6) or more individual I/O tasks. As one skilled in the art will appreciate, with the RAID controller designs currently known in the art, the controller's microprocessor typically must manage all these I/O tasks as they occur. The routines required to manage the RAID hardware set-up and the interrupt service threads for each of the individual RAID I/O tasks result in inefficient interruption of the microprocessor and thrashing of the microprocessor primary and secondary cache.

It is desirable, therefore, to significantly reduce the number of interrupts that the primary processor must handle to improve processor performance.

SUMMARY OF THE INVENTION

The present invention provides novel apparatus and methods for using interrupt score boarding with intelligent peripheral devices. This invention is particularly useful for building high throughput/low latency storage system controllers.

In one embodiment, the present invention provides a storage system controller having a main processor, a memory and a device interface adapted to interface with a peripheral component, such as a disk array or the like. The controller further includes an interrupt management scoreboard adapted to receive a plurality of writes from the peripheral component prior to interrupting the main processor. In this manner, the scoreboard facilitates the reduction of interrupts to the main processor by receiving writes, such as operation completion updates, instead of having the peripheral components directly interrupt the main processor. For example, in one aspect, the plurality of writes include a plurality of status messages and/or a plurality of interrupts.

In alternative aspects, the scoreboard may include a co-processor fabricated on the same chip as the main processor, or a co-processor in electrical communication with the main processor via a bus. Alternatively, the scoreboard may include at least one register within the main processor.

In one aspect, the peripheral component includes a storage media for use with a RAID controller, although a wide range of peripheral components may be used within the scope of the present invention. For example, the peripheral component may include a storage array, an optical disk drive, just a bunch of disks (JBOD), and the like. In another aspect, the controller has a plurality of device interfaces adapted to interface with a plurality of peripheral components.

The present invention further provides exemplary methods of controlling a storage system. One particular method includes the step of providing a storage system controller having a main processor, a memory, a device interface, and an interrupt management scoreboard. A peripheral component is provided to be in electrical communication with the controller via the device interface. The method includes determining a group of tasks to be executed prior to interrupting the main processor, setting up the interrupt management scoreboard, and sending the group of tasks to the peripheral component. The group of tasks are executed and the peripheral component or the device interface issues a write to the scoreboard after the peripheral component executes each of the tasks within the group of tasks. The method further includes interrupting the main processor after the one or more peripheral components or the one or more device interfaces has issued a group of writes corresponding to the group of tasks to the scoreboard. In this manner, the main processor identifies a desired group of tasks to be completed before the main processor needs to be interrupted. The main processor uses the scoreboard to ensure that all of the tasks of an operation are completed before the main processor is interrupted.

In one aspect, the device interface includes a plurality of device interfaces and the peripheral component includes a plurality of peripheral components. Tasks within the group of tasks are then sent to the plurality of peripheral components as appropriate. In one aspect, the device interface includes an intelligent device interface, for example a device interface having intelligent I/O capabilities.

In one particular aspect, the step of setting up the scoreboard includes setting up at least one register within the main processor to receive the group of writes. In this manner, the step of interrupting the main processor involves the main processor reading the scoreboard. Alternatively the interrupting step includes an intelligent device, such as the peripheral component or an intelligent device interface issuing an interrupt to the main processor when all of the scoreboard writes are complete.

In an alternative method of controlling a storage system of the present invention, the method includes the steps of providing a storage system controller and a peripheral component as previously described. A group of N tasks are identified to be executed prior to interrupting the main processor. The interrupt management scoreboard is set up, and the group of N tasks are sent to the peripheral component(s). Preferably, the steps of identifying the group of N tasks and setting up the scoreboard are performed by the main processor.

The method includes executing a first task within the group of tasks with the peripheral component. After the first task executes, a first write is issued to the scoreboard. If an error occurs during the processing of the first task, the main processor may be interrupted with an error message. Otherwise, the second through Nth tasks within the group of tasks are executed, with 2nd through Nth writes to the scoreboard upon successful completion of each task. The main processor may be interrupted in the event one of the tasks ends in an error. Assuming no errors, the main processor is interrupted after the peripheral component(s) has issued a group of writes corresponding to the group of tasks to the scoreboard. In other words, the main processor is interrupted after the successful completion of the group of N tasks that were identified and grouped to be executed prior to interrupting the main processor.

Alternatively, first through Nth writes are written to the scoreboard prior to interrupting the main processor. Each write is an error message if the corresponding task is unsuccessfully executed, or a completion message if the corresponding task is successfully executed. After first through Nth writes to the scoreboard corresponding to the at least attempted execution of the N tasks, the main processor is interrupted.

In one particular aspect, at least one register is set up within the main processor to receive the group of writes. Alternatively, the scoreboard can be external to the main processor as previously described. In another aspect, the interrupt is issued to the main processor by the peripheral component or by an intelligent device interface. In this manner, the intelligent peripheral component and/or the device interface can interrupt the main processor when an error is encountered.

A more complete understanding of the present invention may be derived by referring to the detailed description of preferred embodiments and claims when considered in connection with the figures, wherein like reference numbers refer to similar items throughout the figures.

BRIEF DESCRIPTION OF THE DRAWINGS

FIG. 1 is an overall schematic of a storage system controller according to the present invention;

FIG. 2 is a schematic of an interrupt scoreboard according to the present invention; and FIG. 3 is a flow chart describing a method of the present invention.

DESCRIPTION OF THE PREFERRED EMBODIMENT

As depicted in FIG. 1, the present invention provides an exemplary storage system controller 10. Storage system controller 10 may be used with a wide range of storage systems, including RAID systems described in further detail in conjunction with the following figures. The use of controller 10 for RAID system control is described in further detail in U.S. application Ser. No. 09/374,053, (Attorney Reference No. 17320-008200), entitled "Methods and Apparatus for RAID Hardware Sequencing to Achieve Higher Performance RAID," filed contemporaneously herewith, the complete disclosure of which is incorporated herein by reference.

Controller 10 includes a main processor 12 in electrical communication with a peripheral component interconnect (PCI) bus 20 or other suitable system bus used in computer systems. Controller 10 includes at least one device interface 18 in electrical communication with PCI bus 20 to permit the interface of a peripheral component with controller 10. While FIG. 1 depicts controller 10 having three device interfaces 18, it will be appreciated by those skilled in the art that a larger or smaller number of interfaces 18 may be used within the scope of the present invention.

Device interfaces 18 may comprise a wide-range of components, including a peripheral component interconnect (PCI), a small computer system interface (SCSI), a Universal Serial Bus (USB), a fibre channel and the like. In addition, device interface 18 may include intelligent I/O capabilities. Device interfaces 18 are adapted to interface with a wide range of peripheral components. For example, device interfaces 18 may interface with a disk array 28, an optical drive 30, a plurality of disks (JBOD) 32, other storage media, and the like.

A bus bridge 22 electrically connects PCI bus 20 with a shared memory bus (SMB) 16. In one embodiment, SMB 16 has the capacity to transfer about 533 megabytes per second and PCI bus 20 has the capacity to transfer about 133 megabytes per second. For controller 10 used with RAID peripheral devices, controller 10 may further include an exclusive OR (XOR) engine 26, such as may be needed for parity calculation. A memory 14 is coupled to XOR engine 26 or, alternatively, to SMB 16.

Controller 10 further includes an interrupt management scoreboard 24. Scoreboard 24 operates to minimize the number of interrupts the peripheral components send to main processor 12 by consolidating those interrupts in a manner described in further detail in conjunction with FIG. 3. As shown in FIG. 1, interrupt management scoreboard 24 is a separate co-processor or hardware state device in electrical communication with main processor 12 via PCI bus 20. Alternatively, scoreboard 24 can be a co-processor fabricated on the same chip as main processor 12. Scoreboard 24 also may hang off of SMB 16 and be in electrical communication with main processor 12 via an electrical conductive path that includes SMB 16, bus bridge 22 and PCI bus 20.

Further, as shown in FIG. 2, scoreboard 24 may comprise one or more registers 40 within main processor 12 or located elsewhere in controller 10. For example, scoreboard 24 may reside in XOR engine 26, device interface 18, a gate array, a raid assist chip, an application specific integrated circuit (ASIC) tied to PCI bus 20, and the like. FIG. 2 depicts-scoreboard 24 having a plurality of registers 40, each having thirty-two bits 42. Alternatively, registers 40 can be 64 bit registers 40, or the like. In this embodiment, main processor 12 sets up register(s) 40 to be scoreboard 24. Register(s) 40 then receive the writes as described below in further detail.

As described in FIG. 3, scoreboard 24 reduces the number of interrupts required to be sent to main processor 12. In an exemplary method 100 of the present invention, method 100 includes the process of determining a specific number of tasks that need to occur to complete a particular operation (step 110). Step 110 preferably is performed by main processor 12. Main processor 12 then sets up interrupt management scoreboard 24 (step 120) and sends the group of tasks to be performed to one or more peripheral components. The peripheral component(s) receive the group of tasks (step 130) and execute them (step 140). Upon successful completion of each task of the group of tasks, the peripheral component or an intelligent device interface connected to the peripheral component writes a value to scoreboard 24 (step 140). Upon successful completion of all of the tasks within the group of tasks, the peripheral component or the intelligent device interface sends an interrupt to main processor 12 (step 150).

By way of example, in the embodiment in which scoreboard 24 comprises plurality of registers 40, method 100 can occur as follows. Main processor 12 sets the desired number of bits 42 within register(s) 40 to the binary value "1". For a group of five tasks or subtasks, five bits 42 are set to "1" (e.g., 00011111). The grouped tasks are sent to the appropriate peripheral devices for execution. A task descriptor is given to each peripheral device for each task to be executed (e.g., 00000010). The successful completion of a task by, for example, disk array 28 results in the controller of disk array 28 or device interface 18 corresponding to disk array 28 clearing the bit 42 in scoreboard 24 associated with that task to a binary value "0" (e.g., 00011101). Upon completion of all of the grouped tasks, bits 42 that had been set to "1" by main processor 12 during scoreboard 24 set-up have now all been cleared to "0". In accordance with one embodiment of the present invention, main processor 12 may be configured to poll the interrupt scoreboard 24 for completion, (i.e., all bits 42 in register 40 set to zero (0)). If, during polling, microprocessor 12 determines that all tasks are complete and all registers are set to zero (0), microprocessor 12 will take back processing control.

In accordance with another embodiment of the present invention, scoreboard 24 may be configured as or embodied in a state machine or co-processor. In accordance with this aspect of the present invention, socreboard 24 may have some intellegent processing capabilities. For example, instead of microprocessor 12 polling scoreboard 24 for completion, scoreboard 24 may be configured to notify or interrupt microprocessor 12 after all tasks have been completed and bits 42 of register 40 have been set to zero (0).

Preferably, controller 10 is coupled to intelligent peripheral devices 28–32, for example via device interface 18. In this manner, device interfaces 18 contain sufficient processing capabilities to transmit an error message directly to main processor 12 in the event one of the grouped tasks produces an error. Should this occur, all grouped tasks may not be completed before main processor 12 is interrupted. Similarly, the peripheral component can be configured to write to scoreboard 24 and/or interrupt main processor 12 when an error occurs.

Alternatively, all tasks are completed prior to main processor 12 interruption. In one embodiment, writes issued to scoreboard 24 are an error message for tasks that are unsuccessfully executed, and a completion message for successfully executed tasks. Main processor 12 then can determine which task produced an error, for example, by noting the corresponding bit 42 remains a "1".

It can be seen by those skilled in the art that the present invention provides a number of advantages. For example, scoreboard 24 allows a reduction or minimization of peripheral hardware interrupts to main processor 12 by consolidating those interrupts. Once main processor 12 has established a certain number of tasks that need to occur for a particular operation, main processor 12 sets up scoreboard 24 to wait for these tasks to be completed before interrupting main processor 12. After the successful completion of all grouped tasks, main processor 12 is interrupted. This system and process reduces or eliminates a number of interrupts, such as peripheral devices interrupting main processor 12 to report the successful completion of each task. Instead, main processor 12 is interrupted upon the successful completion of all of the grouped tasks. This capability significantly reduces the number of interrupts that main processor 12 must handle.

Further, it also reduces the main processor's interrupt service routine because main processor 12 can assume that no error handling is necessary for the grouped operations. Error processing will only occur upon an error interrupt. Hence, checks for error can be avoided. By reducing or minimizing the number of interrupts to main processor 12, fewer contact switches are incurred by main processor 12. Further, a higher locality of reference within the execution stream is seen by main processor 12, resulting in better use of the primary and secondary caches by main processor 12. Further, shorter execution threads lead to higher throughput and lower latency to controller 10, in part due to the avoidance of error code processing.

The present invention will be useful in a wide range of systems. The present invention will be particularly useful for the control of RAID and other suitable storage devices. This is the case due to the large number of reads and writes required in a typical RAID operation. As a result, main processor 12 can identify tasks within a specific RAID operation that need to occur, and can task the scoreboard 24 to only interrupt processor 12 upon completion of all tasks making up the RAID operation.

The invention has now been described in detail. However, it will be appreciated that certain changes and modifications may be made. Therefore, the scope and content of this invention are not limited by the foregoing description. Rather, the scope and content are to be defined by the following claims.

What is claimed is:

1. A storage system controller comprising:
   a main processor;
   a memory;
   a device interface adapted to interface with a peripheral component; and
   an interrupt management scoreboard adapted to receive a plurality of writes from said peripheral component prior to interrupting said main processor.

2. A storage system controller as in claim 1, wherein said plurality of writes comprise a plurality of status messages.

3. A storage system controller as in claim 1, wherein said plurality of writes comprise a plurality of interrupts.

4. A storage system controller as in claim 1, wherein said scoreboard comprises a co-processor disposed within said main processor.

5. A storage system controller as in claim 1, wherein said scoreboard comprises a co-processor in electrical communication with said main processor via a bus.

6. A storage system controller as in claim 1, wherein said scoreboard comprises at least one register within said main processor.

7. A storage system controller as in claim 1, wherein said peripheral component comprises a RAID storage device.

8. A storage system controller as in claim 1, wherein said device interface comprises a plurality of device interfaces adapted to interface with a plurality of peripheral components.

9. A storage system controller as in claim 1, wherein said peripheral component is selected from a group of components consisting of a direct memory access component, a storage array, an optical disk drive, and a JBOD.

10. A method of controlling a storage system comprising the steps of;
    providing a storage system controller comprising a main processor, a memory, a device interface, and an interrupt management scoreboard;
    providing a peripheral component in electrical communication with said main processor via said device interface;
    determining a group of tasks to be executed prior to interrupting said main processor;
    setting up said interrupt management scoreboard;
    sending said group of tasks to said peripheral component;
    executing said group of tasks, said peripheral component issuing a write to said scoreboard after executing each of said tasks within said group of tasks; and
    interrupting said main processor after said peripheral component has issued a group of writes corresponding to said group of tasks to said scoreboard.

11. A method as in claim 10, wherein said device interface comprises a plurality of device interfaces and said peripheral component comprises a plurality of peripheral components.

12. A method as in claim 11, wherein said sending step comprises sending said group of tasks to said plurality of peripheral components.

13. A method as in claim 10, wherein said peripheral component comprises an intelligent peripheral hardware component.

14. A method as in claim 10, wherein said setting up step comprises setting up at least one register within said main processor to receive said group of writes.

15. A method as in claim 14, wherein said interrupting step comprises said main processor reading said scoreboard.

16. A method as in claim 10, wherein said interrupting step comprises issuing an interrupt to said main processor with said scoreboard.

17. A method of controlling a storage system comprising the steps of;
   (a) providing a storage system controller comprising a main processor, a memory, a device interface, and an interrupt management scoreboard;
   (b) providing a peripheral component in electrical communication with said device interface;
   (c) determining a group of N tasks to be executed prior to interrupting said main processor;
   (d) setting up said interrupt management scoreboard;
   (e) sending said group of tasks to said peripheral component;
   (f) executing a first task within said group of tasks, said peripheral component issuing a first write to said scoreboard after executing said first task;
   (g) interrupting said main processor if said first write comprises an error message;
   (h) repeating steps (f) and (g) for second through Nth tasks within said group of tasks; and
   (i) interrupting said main processor after said peripheral component has issued a group of writes corresponding to said group of tasks to said scoreboard.

18. A method as in claim 17, wherein said setting up step comprises setting up at least one register within said main processor to receive said group of writes.

19. A method as in claim 17, wherein said step (g) comprises issuing an interrupt to said main processor with said peripheral component.

20. A method of controlling a storage system comprising the steps of;
   (a) providing a storage system controller comprising a main processor, a memory, a device interface, and an interrupt management scoreboard;
   (b) providing a peripheral component in electrical communication with said device interface;
   (c) determining a group of N tasks to be executed prior to interrupting said main processor;
   (d) setting up said interrupt management scoreboard;
   (e) sending said group of tasks to said peripheral component;
   (f) executing a first task within said group of tasks;
   (g) issuing a first write to said scoreboard after executing said first task, said first write comprising an error message if said first task is unsuccessfully executed and a completion message if said first task is successfully executed;
   (h) repeating steps (f) and (g) for second through Nth tasks within said group of tasks; and
   (i) interrupting said main processor after said peripheral component has issued a group of writes corresponding to said group of tasks to said scoreboard.

* * * * *